United States Patent [19]
Richardson et al.

[11] 3,880,619
[45] Apr. 29, 1975

[54] SOLID SORBENT FOR TRAPPING IODINE

[75] Inventors: Donald M. Richardson; Carlos E. Bamberger, both of Oak Ridge, Tenn.

[73] Assignee: The United States of America as represented by the United States Atomic Energy Commission, Washington, D.C.

[22] Filed: Sept. 5, 1974

[21] Appl. No.: 503,238

[52] U.S. Cl. .......................... 55/71; 176/37; 210/37
[51] Int. Cl. ............................................. B01d 53/00
[58] Field of Search ........ 55/71, 74; 176/37; 210/37

[56] References Cited
UNITED STATES PATENTS

| | | | |
|---|---|---|---|
| 3,243,380 | 3/1966 | Conn | 176/37 |
| 3,789,581 | 2/1974 | Carr et al. | 55/74 |

Primary Examiner—Charles N. Hart
Assistant Examiner—Ethel R. Cross
Attorney, Agent, or Firm—Dean E. Carlson; David S. Zachry; John B. Hardaway

[57] ABSTRACT

Lead monoxide is used as a sorbent for iodine.

6 Claims, No Drawings

SOLID SORBENT FOR TRAPPING IODINE

BACKGROUND OF THE INVENTION

This invention was made in the course of, or under, a contract with the U.S. Atomic Energy Commission. It relates generally to the art of removing iodine and particularly radioactive iodine from fluid streams.

In the field of nuclear fuel reprocessing various methods are utilized to ultimately separate useable fissile materials from the waste and daughter products generated during the normal life of fuel elements within a nuclear reactor. Many of the isotopes which are produced and contained within the used fuel elements are relatively dangerous and must be isolated and contained for long term storage. Volatile radioactive gases, iodine in particular, present the greatest problem in this area.

Various methods of removing and isolating radioactive iodine from process streams and solutions have been developed. Such processes are described in U.S. Pat. Nos. 3,752,876, 3,792,154, and copending commonly assigned application Ser. No. 278,842. These processes generally involve contacting gas streams containing radioactive iodine with scrubbing solutions to sorb and remove iodine from the gas stream. Other processes involve removing the iodine from scrub solution for storage.

Any residual iodine which remains in the air stream after scrubbing by the above processes is normally removed by passing the air through a solid sorbent. Silver zeolite and charcoal have been conventionally used as sorbents in such processes. While both sorbents perform quite satisfactorily for their intended purpose, certain disadvantages inhere in each. Silver zeolite is relatively expensive and charcoal is flammable under some conditions of operation.

SUMMARY OF THE INVENTION

It is thus an object of this invention to provide a new solid sorbent for removing iodine from fluid streams.

It is a further object of this invention to provide a solid sorbent which has none of the disadvantages present in the prior art.

These as well as other objects are accomplished by using lead monoxide as a sorbent for iodine.

DETAILED DESCRIPTION

According to this invention it has been found that lead monoxide through some mechanism other than compound formation by direct chemical reaction is capable of sorbing and retaining a large percentage of its own weight in elemental iodine. As used within this disclosure the terms "sorb", "sorbent", and "sorption" mean and relate to physical or chemical retentions other than by direct chemical reaction and compound formation. Such retention is generally but not exclusively caused by the phenomena of absorption, adsorption and dissolution.

Lead monoxide has been found capable of sorbing up to about 21 weight percent iodine from fluid streams; i.e. either gaseous or liquid streams. As a comparison, silver zeolite is capable of sorbing about 15 weight percent. The lead monoxide used in this invention may be either in the usual prepared form of litharge or the naturally occurring massicot. The layered crystal structure of lead monoxide is apparently such that iodine is accommodated between the layers. The iodine capacity appears to be at a maximum near 100°C, which is thus the preferred temperature of operation. However, lead monoxide is generally effective as a sorbent within the range of room temperature ($\approx 25°C$) to about 150°C.

Lead monoxide does suffer from the disadvantage that it is soluble in acid and alkaline solutions. The operable pH range for aqueous solutions is thus from about 7 to 12. For gaseous streams containing acid gases which react with lead monoxide, e.g. HCl, HF, HBr, HI, $SO_2$ and $SO_3$, it is necessary to subject the gas to water scrubbing prior to contacting the lead monoxide sorbent. Of course aqueous process streams may also be neutralized prior to contacting the lead monoxide so as to eliminate the possibility of any reaction between the stream and the sorbent.

Lead monoxide is an effective sorbent within the temperature range of from room temperature to about 150°C. At 250°C iodine is released by the lead monoxide as a gas. Saturated lead monoxide may thus be regenerated by heating to a temperature within the range of 300° to 500°C. The iodine vapors given off during regeneration may then be condensed for storage. Regeneration must be limited to temperatures of 500°C and below because lead monoxide begins to vaporize at temperatures above this range.

Essentially any physical form of lead monoxide has been found to effectively sorb iodine. However, the preferred form is porous granules within the size range of 8 to 16 mesh (U.S.). These granules are preferably maintained within a contacting column. Coarse powders maintained on a glass or ceramic support within a contacting column may also be used.

Having generally described the sorbent of this invention, the following specific examples are given as a further illustration of the use of lead monoxide as an iodine sorbent.

EXAMPLE I

To determine the capacity of PbO for iodine, 3.89 g PbO powder (litharge), 8.49 g $I_2$ and 300 cc $H_2O$ were stirred magnetically under a flowing atmosphere of argon. The resultant dark brown solid was filtered, treated with $CCl_4$ to remove surface adsorbed $I_2$, and then a portion was heated in air to about 400°C. This portion evolved profuse vapors of $I_2$ and was converted to PbO losing 364 mg of $I_2$ and moisture per gram of PbO. Another portion of the solid was washed with KI (aq.) with the result that the solid turned yellow. This was dried, heated to about 400°C and lost somewhat less $I_2$ than the first portion. It was concluded from this that KI solution removed part of the iodine by dissolution.

EXAMPLE II

In another experiment, 12.08 g PbO, 8.17 g $I_2$, and 20 cc $H_2O$ were heated in a closed container, similar to an autoclave, at 110°C overnight. After filtering and washing with $CCl_4$ and drying in air, the brown solid was determined by titration to contain 20.7 weight percent $I_2$.

EXAMPLE III

In another experiment, 13.18 g PbO, 26.43 g $I_2$ and 300 cc $H_2O$ were boiled under reflux conditions. The solid was recovered and a portion was heated at above 400°C. The weight loss, which was due primarily to a loss of iodine, was 22.27 weight percent of the initial PbO weight.

EXAMPLE IV

A "dumb-bell" shaped flask, with $I_2$ in one lobe and PbO in the other, separated by a plug of glass wool, was heated for 20 hours at 110°C in an oven. A portion of the resultant $I_2$-containing solid was heated and lost 18 mg/g PbO. In a similar experiment at 47°C, the product lost 13.6 mg/g PbO. The weight losses in this example were due primarily to iodine since there was very little moisture present. A significant observation is that the compartment containing the PbO always exhibited a lesser violet coloration (due to $I_2$) in the gas phase. This indicated that no equilibrium had been reached and, obviously, that the vapor pressure of $I_2$ was much lower in the presence of PbO.

EXAMPLE V

Argon, saturated with water, was passed through $I_2$ and then through PbO at room temperature. After various lengths of time, portions of the PbO (plus $I_2$) were heated to about 900°C to determine iodine loss by chemical analysis of the vapors given off. After one day of flow, the product lost 1.74 mg/g PbO; after two days, 2.59 mg/g PbO; and after 20 days, 6.54 mg/g PbO.

The ability of lead oxide to sorb elemental iodine without chemical reaction is quite surprising. However, the saturated lead monoxide of the above examples was checked by X-ray diffraction and found to still contain the same litharge structure with no evidence of compound formation. In fact, the high percentage of iodine contained within the lead monoxide caused substantially no change in the diffraction pattern.

While this invention has been described in terms of the use of lead monoxide alone as a sorbent for iodine, it is understood that various catalysts, such as copper, may also be employed in conjunction with the lead monoxide. Such modifications are embodied within the scope of the appended claims.

What is claimed is:

1. In a method of removing iodine from a fluid wherein said fluid contacts a solid sorbent for sorbing iodine from said fluid, the improvement comprising using lead monoxide as said solid sorbent.

2. The improvement according to claim 1, wherein said lead monoxide is in the form of litharge.

3. The improvement according to claim 1 wherein said fluid is an aqueous solution.

4. The improvement according to claim 1 wherein said fluid is a gas.

5. The improvement according to claim 1 wherein the fluid contacts the lead monoxide sorbent at a temperature within the range of room temperature to about 150°C.

6. The improvement according to claim 1 including the further step of regenerating said lead monoxide by heating said lead monoxide to a temperature within the range of 300° to 500°C to give off iodine vapor, and condensing said iodine vapor.

* * * * *